United States Patent [19]

Levy

[11] 3,944,709

[45] Mar. 16, 1976

[54] SURFACE MODIFICATION BY ELECTRICAL DISCHARGE IN A MIXTURE OF GASES

[75] Inventor: Boris Levy, Wayland, Mass.

[73] Assignee: Polaroid Corporation, Cambridge, Mass.

[22] Filed: May 13, 1974

[21] Appl. No.: 469,435

[52] U.S. Cl. ................ 428/409; 428/412; 428/457; 428/474; 428/480; 428/523; 427/40; 427/41; 427/414

[51] Int. Cl.[2] ...................... B05D 3/06; B32B 33/00

[58] Field of Search .......... 117/47 A, 93.1 GD, 118; 428/409, 474, 412, 457, 480, 523; 427/40, 41, 414

[56] References Cited

UNITED STATES PATENTS

| | | | |
|---|---|---|---|
| 3,057,792 | 10/1962 | Frohlich | 117/47 A |
| 3,274,089 | 9/1966 | Wolinski | 117/93.1 CD |
| 3,275,540 | 9/1966 | McBride | 117/93.1 CD |
| 3,288,638 | 11/1966 | Van Paassen et al. | 117/93.1 CD |
| 3,309,221 | 3/1967 | Smith | 117/47 A |
| 3,387,991 | 6/1968 | Erchak | 117/93.1 GD |
| 3,457,156 | 7/1969 | Fisher | 117/93.1 GD |
| 3,493,416 | 2/1970 | Hansen | 117/47 A |
| 3,761,299 | 9/1973 | Lidel | 117/47 A |

*Primary Examiner*—J. H. Newsome
*Attorney, Agent, or Firm*—Mart C. Matthews; Philip G. Kiely

[57] ABSTRACT

The characteristics of the surface of an article may be modified, e.g., in respect to adhesion, wettability or other physical characteristics, by exposing the surface to an electrical discharge in a mixture of certain gases. The practice of this invention is particularly useful in improving the gelatin adherence characteristics of a photographic film base support.

13 Claims, No Drawings

SURFACE MODIFICATION BY ELECTRICAL DISCHARGE IN A MIXTURE OF GASES

BACKGROUND OF THE INVENTION

1. Field of the Invention

This invention relates to the modification of a surface by employing an electrical discharge in a gaseous atmosphere and, more specifically, to enhancing the adhesion, wettability, etc., of such a surface by exposure to an electrical discharge in a mixture of gases.

2. Description of the Prior Art

Processes for the initiation of polymerization at the surface of a substrate and specifically for the deposition of a thin, uniform polymer film upon a surface by employing a plasma (an excited gas phase) generated from an electrical discharge in an atmosphere of gaseous organic monomer are well established in the art. Generally in these processes a single ethylenically unsaturated monomer such as styrene is introduced into a previously evacuated chamber and brought to a partial vacuum. The item to be coated, e.g., a continuously moving web of metal, textile paper, plastic film, rubber, etc., serves as one of the electrodes or is in close contact with an electrode and, usually, alternating current at several hundred volts is supplied thereto at low current density to produce an electrical discharge. This electrical energy is transferred to the gaseous medium primarily to form a plasma by ionization or other excitation of the gas phase molecules, which eventually leads to chemical changes in the monomer as bonds are broken and new ones formed. It is believed that ions, radicals and/or ion-radical fragments are thus formed, which recombine as they accumulate on the electrodes or other surfaces in contact with the plasma to form polymeric coatings thereon. Detailed descriptions of such processes may be found in the art, for example, U.S. Pat. Nos. 2,932,591; 3,057,792; 3,068,510; and 3,069,283.

Normally, surface modification of a substrate through exposure to a plasma as described above is accomplished by using a single gaseous monomer, preferably one with some carbon-carbon unsaturation, which alone serves as the propagating species in the polymerization to form a homopolymer. Saturated aliphatic compounds alone have been considered very inefficient in such gas discharge reactions, showing generally unacceptable yields of polymer per kilowatt hour.

Particularly significant improvements have been reported in the hydrophilic (wetting) properties of a variety of substrates which have been subjected to two or more successive ionizing discharges using a different activated gas for each such discharge. See, for example, U.S. Pat. No. 3,477,902 and 3,600,122. In general, the discharge in the first gas of these multistep processes serves to flood the surface of the substrate with stable reactive sites, e.g., peroxide groups, which subsequently lead to polymerization reactions at the substrate surface upon discharge in the second gas.

Multicomponent gas phase systems similar to those of the present invention have been employed in connection with the synthesis of copolymers through high energy nuclear radiolysis reactions, as described in my U.S. Pat. No. 3,462,354. Such a system may comprise, for example, the three gaseous components X, A and B, where X is a rare gas molecule and A and B are reactant gas molecules. Under specified conditions, when the above mixture is irradiated with high energy nuclear radiation, e.g., gamma radiation, the rare gas X absorbs most of the radiation energy, thereby forming rare gas ions which then transfer charge to the reactant molecule A, ionizing the latter, and these ions react with the other reactant molecule B in an ion-molecule reaction to form products of valve from relatively low value reactants. An illustrative system of the above-described type would be one comprising xenon as X, ethane as A and carbon monoxide as B.

Where one desires only small amounts of polymer for coating or surface modification purposes, however, high energy radiation from electron accelerators or radioactive sources is not well suited because of the expense, complexity, potential hazard and relatively long irradiation exposures connected therewith. It would, therefore, be advantageous if meaningful surface modification of a substrate could be obtained by combining the convenience and economies of a low energy source such as the aforedescribed electrical discharge with the advantages of material cost and simplicity offered by the simple gaseous mixtures such as those just mentioned.

SUMMARY OF THE INVENTION

In the present invention, a surface, for example, an organic polymeric surface or a metallic surface, may be modified in respect to its physical properties, e.g., wettability, by exposing the surface to a mixture of gaseous reactants which has been "activated" by an electrical discharge between electrodes, preferably a glow discharge.

It is believed that surface modification according to this invention may result from a copolymerization or other reaction between the gases in the mixture under the influence of the electrical discharge to form a thin layer of a reaction product, e.g., a copolymer, at the surface which alters its physical properties.

In a preferable embodiment employing a glow discharge, the mixture of gases constituting the medium therefor comprises a first gaseous reactant which contains a multiple covalent bond involving carbon, oxygen and/or nitrogen atoms, other than an ethylenic bond, and at least a second different gaseous reactant which is void of such multiple bonds and contains either single bonds between its atoms, i.e., are saturated, or have ethylenic unsaturation. Preferably, the first reactant also has an ionization potential and concentration which is greater than the second monomer to encourage the ion-molecule reactions which are thought to lead to the desired copolymerization reactions.

According to an advantageous mode of practicing the invention, mixtures of such readily available gases as, for example, carbon monoxide and ethane, carbon monoxide and ammonia or ammonia and acetylene may be employed in a glow discharge at several hundred volts A.C. in a partial vacuum to greatly enhance the characteristics of a substrate surface, for example, by increasing the wettability of several base materials, particularly the various photographic film bases.

It is, therefore, an object of this invention to provide an electrical discharge process which employs a mixture of gaseous reactants to modify the characteristics of the surface of an article.

A further object is to provide a process for depositing a thin coating onto the surface of an article for the purpose of improving the surface properties thereof.

A still further object is to provide a substrate having coated on at least one surface thereof a thin coating formed by an electrical discharge in a mixture of gaseous reactants in contact with said surface.

Another object is to provide a process for increasing the adherence of an aqueous gelatin-containing layer to the surface of an organic polymeric support, particularly a photographic film.

Other objects will in part be apparent and will in part appear hereinafter.

DETAILED DESCRIPTION OF THE PREFERRED EMBODIMENT

The essence of the present invention is the discovery that a desirable modification of the surface of an article may be obtained by subjecting this surface to an electrical discharge in an atmosphere comprising a mixture of certain gaseous reactants.

The term "surface modification" is herein employed to designate a physical change at the surface of an article as the result of the electrical discharge, which change may be manifested in a variety of ways including, for example, an increase in wettability, an enhancement in the adhesion of layers coated on the surface, reduction in the electrostatic charge at the surface, etc. For the purposes of the present detailed description, it will be assumed that this modification is the result of the deposition on the surface of a thin coating of a reaction product of the electrical discharge process.

Although the exact mechanism of the surface modification according to the present invention is not known,, the phenomena observed may be explained from what is known about the high-energy radiolysis of similar multicomponent gas phase systems and also from basic tenets of electrical discharge polymerization processes. Of course, it is understood that the theoretical explanations herein offered by no means limit the invention in any way.

When any radiation induced reaction takes place in a gas phase, ions or other excited species such as free radicals are initially formed by the fragmentation of the gas molecules. These fragments are known to have relatively long lifetime and, as a result, there is good probability that they may react with available neutral molecules in various ways. When these reactions involve a mixture of two or more different reactants as in the present invention, ions of one reactant and molecules of another may combine as the result of ion-molecule reactions to form larger molecules comprising units from each reactant in the mixture. In many cases, the resultant material may possess qualities superior to either reactant alone.

As previously indicated, the electrical energy employed in the present invention serves to break chemical bonds in the organic gas molecules and thereby form excited species which may initiate polymerization reactions. If the bond is broken in an unsymmetrical manner, so that both electrons originally forming the bond remain attached to one of the atoms which were originally bound together, the excited species formed are herein designated as ionic in nature. However, where the bond is broken symmetrically, with each atom retaining an unpaired electron, the reactive species formed are herein referred to generally as free radicals. Polymerization reactions may proceed either by ionic or free radical mechanisms, although the detailed description of one form of the present invention will hereinafter be described in terms of excited species formed by ionization. However, it is to be understood that free-radical processes may also be involved and are within the scope of this invention.

When discussing the electrical energy required to break chemical bonds and initiate the chemical reactions described herein, it is customary to employ units of electron volts (eV), which may be defined as the units of energy equal to the energy gained by an electron in passing from a point of low potential to a point one volt higher in potential (or $1.60 \times 10^{-12}$ erg). Ionization potentials expressed hereinafter for the various gases employed in the practice of this invention relate to the voltage or potential difference in electron volt units required to ionize the particular gas (i.e., remove an electron from its atomic orbit).

It will be recognized that such conditions as current density, pressure, voltage and temperature used for the electrical discharge treatment of this invention will vary depending on the type of discharge and materials employed. Optimum operating conditions are known in the art for various types of electrical discharge and these may be used herein if a meaningful surface modification of an article according to this invention may be obtained thereby.

A preferred electrical discharge for the practice of this invention is the self-sustaining glow discharge type, which is herein characterized as a low-pressure, low-voltage electrical discharge, i.e., conducted in a partial vacuum, for examples, about 0.1 to 10 mm mercury pressure, at ambient temperatures and several hundred volts. Higher pressures can be utilized if accompanied by the appropriate increase in voltage. The basic equipment for glow discharges of the type suitable for the present invention is conventional in the art, and may consist of an evacuated chamber with access to sources of the gaseous reactants under pressure and spaced-apart electrodes in the chamber wired to an external power supply. Preferably, alternating current of utility line frequency (50–60 c.p.s) at voltages in the range of 200–1000 volts is supplied at low current density to the electrodes to produce in the gaseous atmosphere of the chamber the mild sparks and more or less uniform illumination which characterizes the glow discharge. A further description of the above-described glow discharge and variations thereof may be found in the book, *The Plasma State*, by E. J. Hellund, Reinhold Publishing Corporation (1961), and also various U.S. patents, including U.S. Pat. Nos. 3,444,061; 3,450,617 and those previously mentioned.

Mixtures comprising a wide variety of gaseous reactants are contemplated as suitable for the practice of this invention, as will be described in more detail later. The compounds selected are all characterized by being normally gaseous or having such low boiling points as to be vaporized under the conditions of the electrical discharge reaction. Preferably these compounds are readily available, inexpensive materials with sufficient vapor pressure at operating conditions to sustain a glow discharge and are capable of reaction together under the influence of such a discharge. This invention lends itself to the use of compounds which are not normally considered monomeric materials, such as for example, oxides of carbon, lower alkanes, ammonia and the like.

At least two different gaseous reactants of certain characteristics to be described hereinafter must be present in the mixture serving as the discharge medium of the present invention, although it will be understood that more than two reactants and the inclusion of essentially nonreactive gases in the mixture are also possible.

When the gaseous mixtures of this invention are subjected to an electrical discharge, several phenomena are possible and may in fact explain the surface modification which is observed in the practice of the invention. For example, in an illustrative two reactant discharge medium suitable for the ion-molecule reactions of the invention, a first reactant A may be designated the "molecule reactant" and the second reactant B a precursor to the ionic species which is formed by the electrical discharge, i.e., the "ion reactant precursor." Reactants A and B are preferably selected to possess different propensities to form an ionized species upon irradiation, i.e., different ionization potentials, with the ion reactant precursor having the lower ionization potential. This selection thus allows the excitation or ionization of B to occur at an energy level lower than that required for the ionization of A, and produce at that energy level a reactive mixture of ions of B and molecules of A. These ions and molecules could be expected to enter into chain-type copolymerization reactions, for example, as illustrated below:

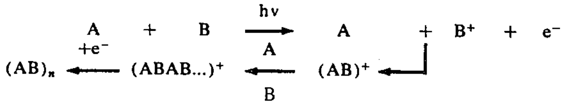

The relative concentrations of the reactants in the mixture may influence the above-described reaction and therefore the molecule reactant A is preferably present at a concentration greater than or at least equal to that of the ion reactant precursor B, in order to avoid as much as possible reaction of the latter with itself. Furthermore, it should be noted that in each system suitable for the practice of this invention, the reactants should be selected so that the chemical reaction between ion and molecule reactants to form the metastable entity $(AB)^+$ is at least thermoneutral and preferably exothermic to ensure that the reaction is thermodynamically possible according to well established principles of chemistry. This determination may be made, for example, from a calculation of the heat of formation of $(AB)^+$ from available thermodynamic data for reactants A and B or may be estimated from assumptions regarding the possible structures of $(AB)^+$ and commonly accepted values for bond energies.

As previously indicated, many mixtures of gaseous reactants are contemplated as suitable for the practice of the invention. Generally speaking, the components of these mixtures may be classified into the two types of reactants described above, each having different general characteristics.

Preferred molecule reactants of the A type comprise compounds whose structure contains a multiple covalent bond involving carbon, oxygen and/or nitrogen atoms, other than an ethylenic bond (which is defined for purposes of this application as the bond represented by C=C). As examples of such multiple bonds, mention may be made of C=O, C ≡ O, C ≡ C, C ≡ N, N ≡ N, O=O, etc. In general, reactants of the A type contain atoms whose valence is unsaturated. The term "structure" herein designates the classical structural formula which can be written for a compound, which may in fact be a resonance hybrid of a variety of structures.

Preferred ion reactant precursors of the B type have a structure which excludes the above-described multiple bonds and contains either single bonds between atoms or one or more ethylenic bonds. Examples of bonds such as found in this second type of reactant include C—H, N—H, C—C, S—H, C—O, C=C, etc. Typically, reactants of the B type contain atoms whose valence is fully saturated or they contain ethylenic unsaturation.

Since electrical discharge processes such as the present invention depend on the breaking and reformation of the chemical bonds in the reactants, the type of bonding between atoms in the reactants is believed to be important and may account at least in part for the fact that a useful surface modifying reaction is possible according to this invention. Single bonds found in B type reactants would be expected to fragment under the influence of the electrical discharge more readily than the multiple bonds of the A type, thus increasing the probability that the above-described ion-molecule mixtures and attendant reactions would take place. However, this theory has value which is independent of the invention and it is not offered as a full explanation.

Since reactants of the A type are characterized as being capable of serving as the molecule reactant in the ion-molecule reactions described hereinbefore, whereas reactants of the B type more appropriately serve as the ion reactant precursor therein, the A type reactant preferably has an ionization potential which is greater than that of the B type reactant with which it is mixed.

As examples of molecule reactants of the A type, mention may be made of the oxides of carbon, particularly carbon monoxide and carbon dioxide; acetylenes such as acetylene, methyl acetylene, ethyl acetylene, etc., and other gaseous compounds having nonethylenic multiple covalent bonds such as, for example, nitrogen, oxygen, hydrogen cyanide, cyanogen, sulfur dioxide and the like.

Ion reactants of the B type may be selected from a wide variety of compounds such as, for example, the lower aliphatic hydrocarbons, i.e., those aliphatic hydrocarbons having from 1 to 4 carbon atoms and particularly the lower alkanes, such as ethane, propane, n-butane, methane, etc., and the lower olefins such as ethylene, propylene, iso-butene, etc. Mention may also be made of ammonia and its derivatives as suitable examples of reactants of the second type.

As examples of specific mixtures within the scope of this invention, mention may be made of the following:

(ionization potentials appear in parenthesis after each reactant)

| First-type reactant | | | Second-type reactant | |
|---|---|---|---|---|
| CO | (14.0) | and | $C_2H_6$ | (11.5) |
| CO | (14.0) | and | $C_2H_4$ | (10.5) |
| CO | (14.0) | and | $C_3H_6$ | ( 9.7) |
| CO | (14.0) | and | iso-$C_4H_8$ | ( 9.2) |
| CO | (14.0) | and | $NH_3$ | (10.2) |
| CO | (14.0) | and | $H_2O$ | (12.6) |
| $CO_2$ | (13.0) | and | $CH_4$ | (12.6) |
| $CO_2$ | (13.0) | and | $C_2H_4$ | (10.5) |
| $O_2$ | (12.1) | and | $CH_4$ | (12.6) |
| $O_2$ | (12.1) | and | $C_2H_4$ | (10.5) |
| $C_2H_2$ | (11.6) | and | $NH_3$ | (10.2) |

It will be understood that mixtures of three or more reactants are also contemplated by this invention, as well as mixtures including any of the various rare or essentially nonreactive gases described previously. Illustrative of the former would be the mixture consisting of carbon monoxide, ethane and ammonia, whereas a mixture consisting of carbon monoxide, ethane and argon or krypton would be illustrative of the latter.

As should be apparent, in each of the mixtures, described above, the reactants should not be mixed indiscriminately for the optimum practice of this invention, but preferably in accordance with the above described conditions of ionization potential and basic principles of thermodynamics. Other considerations known in the art, such as those mentioned previously relative to concentration of components, should also be weighed to optimize the desired results.

One preferred embodiment of this invention involves the modification of a surface by employing a mixture consisting of carbon monoxide, CO, and ethane, $C_2H_6$, and a glow discharge produced by an A.C. voltage between electrodes in a conventional discharge chamber. Ethane in the above reaction may be considered the ion reactant precursor B and possesses an ionization potential of 11.5 eV, which signifies that when a molecule of ethane in its normal or ground state absorbs 11.5 eV of radiation energy from the glow discharge, it can be expected to form a positively charged ion, $C_2H_6^+$. The ethane may also undergo further fragmentation to form several other ionic species, for example $C_2H_5^+$, $C_2H_4^+$, etc. Carbon monoxide, which may be considered the molecule reactant A in this system, has a significantly higher ionization potential of 14.0 eV. The gases are preferably mixed together such that the CO is present in a greater amount, for example, a molar ratio of about 10:1 of CO to $C_2H_6$.

The article whose surface is to be modified may be placed, or preferably advanced through, a discharge chamber containing the mixture of gases in a partial vacuum, e.g., 1 mm Hg. pressure and at room temperature. If the article is a continuous substrate, one electrode may be a roller over which the substrate is guided and the other electrode may be a wire screen disposed over the roller and substrate at a distance of about ¼ inch from the roller. An A.C. voltage of about 400 volts and utility line frequency may then be applied across the electrodes to produce a current of about 60 milliamps. The substrate may be moved slowly between the electrodes through the glow discharge, for example, at a rate of about 60 square inches of surface per minute, with the surface to be modified exposed to the activated gas mixture.

It is preferred that most of the energy produced by the glow discharge is employed to ionize the ethane, however, ionization of the carbon monoxide is possible since it is present in such relatively large amounts. Nevertheless, by virtue of carbon monoxide's higher ionization potential, charge transfer may take place between the ionized carbon monoxide and the ethane, to ultimately result in ionized ethane:

$$CO^+ + C_2H_6 \rightarrow CO + C_2H_6^+$$
$$CO^+ + C_2H_6 \rightarrow CO + C_2H_5^+ + H. \text{ etc.}$$

The resulting ionized ethane is able to react with the molecular CO, as indicated before, and the molar fraction of CO in the mixture is purposely made sufficiently high to bring about this result. Without intending to be bound by theory, it is believed that an exothermic copolymerization reaction such as the folloing may occur:

$$C_2H_6^+ + CO \rightarrow \underset{E}{(C_2H_6CO)^+} + \text{surface} \longrightarrow$$
$$\text{Surface . } (C_2H_6CO)^+ \xrightarrow[C_2H_6]{\text{excess CO}} \text{Surface . } (C_2H_6CO)_n$$

The metastable ionic entity E is reactive, either with itself, or with one or both reactants forming same, or with ethane, and alone, or as part of a chain of such entities, migrates to the surface/electrode where copolymerization may continue until ion-electron recombination (neutralizaton) takes place. These series of reactions thereby can provide a relatively uniform deposit of a copolymer or a similar reaction product on the surface which may account for changes in the properties of that surface.

The term "copolymerization" as used herein and in the claims is intended to denote the chemical rèaction such as depicted above in which molecules or excited series of one reactant and molecules or excited species of another different reactant combine to form larger molecules called "copolymers." The term "reaction product" is intended to designate the material deposited on or otherwise adhered to the surface of the article as a result of the glow discharge induced reaction between the gaseous reactants of the mixture. This reaction product may be of low molecular weight and comprise only a simple compound or may be a high molecular weight copolymer in which units derived from the reactants of the gaseous phase are repeated many times as represented by a high value for the subscript n in the above formula. The actual coating of the reaction product may occur by electro-deposition or the surface may be disrupted in some way so as to react with the product in a grafting-type process. Regardless of the mechanism involved, this invention is intended to encompass any process wherein a change in the surface properties of an article is obtained by exposure to an electric discharge plasma comprising the herein-described mixtures of gases.

The changes in surface properties which are observed after treatment according to this invention, may in large part be a function of the groups found in the deposited coating, for example, various carbonyl groups such as aldehyde, ester or ketone groups may be present. The nature of these groups in comparison with the untreated surface may, for example, make the surface more hydrophilic and therefore more wettable or they may reduce considerably the retention of electrostatic charges by the surface.

It should be understood that there is no necessity in the process of this invention to include an inert or essentially nonreactive gas into the gaseous reaction mixture either as an activating gas or an energy absorbing gas as is common in high energy radiolysis and some electrical discharge surface modification processes in the prior art, although this practice is not excluded from the scope of the invention. Thus, the rare gases such as neon, argon, krypton, xenon or radon may be employed herein if thought advantageous, for example, to minimize indiscriminate bond breakage or to provide additional activation of the surface. However, direct ionization and reaction of the gaseous reactants in the mixtures employed is preferred. This procedure provides a convenient yet inexpensive means for surface modification since generally considered low value but readily available compounds, such as carbon monoxide, ethane, methane, ammonia and the like may be employed exclusively in the discharge mixture.

As examples of materials for which surface modification according to the present invention is contemplated, mention may be made of various substrates including metal, textile, paper, plastic film, and the like. The material treated may be in any shape or form, although an advantageous and preferred mode of practice of this invention involves the surface treatment of a continuous web or strip of material.

The invention is applied very advantageously to the manufacture of supports for photographic products, particularly photographic films in which emulsions containing gelatin or other solutions are coated on the support. The increase in wettability resulting from the practice of this invention greatly improves the adherence of these gelatin coatings to the surface of the support by a treatment which is simple and rapid in comparison with the customary processes employed in the art for this purposes. Any of the various materials which are employed as photographic supports are contemplated as suitable for treatment with this invention, including the organic polymeric materials such as, for example, polyesters such as poly(ethylene glycol terephthalate), polycarbonates, polyamides such as poly(n-hexyleneadipamide), polyolefins such as polyethylene, and other homopolymers and vinyl polymers.

The invention is further illustrated by the following examples which set out representative embodiments thereof, but are not intended to limit the invention to the details set forth therein.

EXAMPLE I

A 10 ft. × 5 inch × 0.003 ft. sample of a polyester film base having on one surface thereof a coating of cellulose acetate butyrate (CAB) was treated as follows:

A vacuum discharge chamber was employed which was connected through valves to a diffusion pump, and also to a source of CO (ionization potential = 14.0 eV) and a source of $C_2H_6$ (11.5 eV) under pressure. The electrodes consisted of a metal roller and a wire screen disposed in the chamber about ¼ inch from each other and connected to a source of A.C. power.

The chamber was first entirely evacuated by the diffusion pump. CO was then released into the chamber with the diffusion pump valved off until a pressure corresponding to 40 mm of mercury was reached. Then $C_2H_6$ was allowed to enter the chamber until the pressure reached a total of 44 mm (i.e., about 4 mm of $C_2H_6$). Thus, a molar ratio of 10:1 of CO to $C_2H_6$ was established in the chamber. The total pressure was then reduced in the chamber by use of the diffusion pump to a total pressure of about 1 mm. The temperature was approximately that of room temperature, or 75° F.

The film base sample was then run through the chamber between the electrodes in contact with the roller electrode at a rate of about 1 foot per minute as it was exposed to a glow discharge between the electrodes produced by the following conditions:

Voltage — 400 volts A.C.
Frequency — 60 c.p.s.
Current — 60 milliamps

A blue colored discharge with a little arcing was obtained. After the film base had run through the discharge, the pressure in the chamber was elevated to atmospheric pressure and the system opened.

A simple test was performed on each surface (polyester and CAB) to determine the change in wettability effected by the above treatment. A drop of water was placed on the surface to be tested and the angle at the point of contact between the drop and the surface of the film observed. In the case of both of the treated surfaces, wettability was very good and the drop spread out along the surface. However, a similar test on the untreated control surfaces resulted in a very high angle and, in fact, the drop remained beaded.

Another test performed involved coating an aqueous gelatin overcoat over the treated surface and allowing it to dry. Then an incision was made across the overcoat, and an adhesive tape pressed firmly over the incision. The tape was torn off briskly and the extent of overcoat adherence checked. The gelatin overcoat adherence was excellent for the treated surfaces, but poor when a similar test was performed on the control sections.

EXAMPLE II

To further characterize the surface modification observed, the procedure of Example I was repeated; however, a strip of gold plated copper foil was employed as the substrate. A uniform brown deposit formed on the foil as a result of the glow discharge treatment and this deposit was analyzed employing a Raman-laser spectrophotometer. The results indicated the presence of carbonyl groups in the deposited product. Similar samples analyzed by IR spectrophotometry indicated broad bands of absorption at wavelengths characteristic of the presence of carbonyl groups in the deposit.

EXAMPLE III

Employing the same apparatus and film base material as described in Example I, a similar glow discharge treatment was performed using a 3:1 mixture of CO (14.0 eV) and $NH_3$ (10.2 eV) as the gaseous mixture. The discharge chamber was evacuated with the diffusion pump and $NH_3$ was introduced and bled off twice to flush the system of any remaining air. The chamber was then filled with $NH_3$ to a pressure of 5 mm of mercury. The CO was then introduced to a total pressure of 20 mm to ensure that 15 mm of CO was present in the chamber. Pressure was reduced to 1.5 mm for discharge. The rate of movement of the base through the discharge was 1 foot per minute and discharge conditions were:

A.C. voltage — 410 volts
Frequency — 60 c.p.s.
Current — 60–70 milliamps

The treated surface wetted extremely well in places. The degree of this wettability, however, was not uniform throughout the sample, although at all locations tested wettability was improved over the untreated surface of the control sample. The treated sample was very hydrophilic and a tackiness developed when rubbed with a finger wet with water.

EXAMPLE IV

The same glow discharge apparatus and film base material as described in Example I were similarly employed to perform a glow discharge treatment using a 1:1 mixture of $C_2H_2$ (11.6 eV) and $NH_3$ (10.2 eV). The discharge chamber was evacuated, the $NH_3$ added to a pressure of 5 mm and the $C_2H_2$ added to a total pressure of 10 mm. The total pressure in the chamber was reduced to 1 mm and the base material, moving through the chamber at a rate of 1 foot per minute, was subjected to a glow discharge produced by:

Voltage — 300 volts
Frequency — 60 c.p.s.
Current — 60 milliamps

Again the treated surface wet very well in comparison to an untreated control.

Since certain changes may be made in the above process without departing from the scope of the invention herein involved, it is intended that all matter contained in the above description shall be interpreted as illustrative and not in a limiting sense.

What is claimed is:

1. A method of modifying the surface properties of a substrate which comprises the steps of:

establishing in a reaction chamber a gaseous medium comprising a mixture of an oxide of carbon with either a lower alkane or ammonia each having a lower ionization potential than said oxide of carbon;

disposing at least a portion of said substrate in said chamber with at least one surface thereof contacting said medium; and applying a voltage in the range from about 200 to 1000 volts across a pair of electrodes disposed in said chamber under a partial vacuum of about 0.1 to about 10 mm Hg pressure so as to maintain a glow discharge in said medium, said glow discharge being sufficient to induce a reaction between the components of said mixture thereby to provide a hydrophilic reaction product on the surface of said substrate which improves the wettability of said surface.

2. A method as defined in claim 1 wherein said oxide of carbon is carbon monoxide.

3. A method as defined in claim 2 wherein said carbon monoxide is present in the major amount.

4. A method as defined in claim 1 wherein said medium further comprises an essentially nonreactive gas.

5. A method as defined in claim 4 wherein said nonreactive gas is neon, argon, krypton, xenon or radon.

6. A method as defined in claim 1 wherein said article is an organic polymeric film base.

7. A substrate having at least one surface modified according to the process of claim 1.

8. A method for increasing the adherence of an aqueous gelatin-containing layer to the surface of a continuous polymeric support of a photographic film, which method comprises:

establishing in a reaction chamber, a gaseous medium comprising a mixture of carbon monoxide and either a lower alkane or ammonia each having a lower ionization potential than said carbon monoxide;

advancing said support through said chamber between electrodes in said chamber, at least one surface thereof contacting said medium;

maintaining a gaseous glow discharge in a partial vacuum of about 0.1 to about 10 mm Hg pressure in said medium by applying an A.C. voltage of from about 200 to about 1000 volts across said electrodes, said glow discharge being sufficient to induce a reaction between the reactants of said mixture which results in the formation of a continuous hydrophilic coating on the surface of said advancing support which improves the wettability of said surface; and applying said aqueous gelatin-containing layer over said coating.

9. A method as defined in claim 8 wherein said lower alkane is ethane.

10. An article having deposited on at least one surface of a support a thin hydrophilic layer comprising the reaction product resulting from an electrical glow discharge conducted at a voltage in the range from about 200 to 1000 volts in a partial vacuum of about 0.1 to 10 mm Hg pressure in a gaseous atmosphere in contact with said surface, said atmosphere comprising a mixture of an oxide of carbon with either a lower alkane or ammonia each having a lower ionization potential than said oxide of carbon.

11. An article as defined in claim 10 wherein said support is a photographic film base support.

12. An article as defined in claim 11 wherein at least one gelatin containing layer is coated over said thin hydrophilic layer.

13. An article as defined in claim 10 wherein said reaction product contains carbonyl groups.

* * * * *